United States Patent  [19]
Okumura et al.

(10) Patent No.: US 7,521,924 B2
(45) Date of Patent: Apr. 21, 2009

(54) MEMBER POSITION DETECTION APPARATUS NOT AFFECTED BY EXTERNAL MAGNETIC FIELD

(75) Inventors: Hirofumi Okumura, Miyagi-ken (JP); Ichiro Tokunaga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/828,130

(22) Filed: Apr. 19, 2004

(65) Prior Publication Data

US 2004/0196029 A1 Oct. 7, 2004

(30) Foreign Application Priority Data

May 7, 2003 (JP) .............................. 2003-128979

(51) Int. Cl.
*G01B 7/14* (2006.01)
(52) U.S. Cl. ............................... 324/207.24; 324/207.2
(58) Field of Classification Search ............ 324/207.11, 324/207.2, 207.24, 207.26, 207.15, 207.21, 324/207.22, 228, 251; 280/735
See application file for complete search history.

(56) References Cited

U.S. PATENT DOCUMENTS

| | | | | |
|---|---|---|---|---|
| 3,681,488 A | * | 8/1972 | Jamison | ........................ 264/83 |
| 4,909,560 A | * | 3/1990 | Ginn | ........................ 296/65.15 |
| 5,781,005 A | * | 7/1998 | Vig et al. | .................. 324/207.2 |
| 6,053,529 A | | 4/2000 | Frusti et al. | |
| 6,215,299 B1 | * | 4/2001 | Reynolds et al. | ......... 324/207.2 |
| 6,784,774 B1 | * | 8/2004 | Okumura | ..................... 335/205 |
| 6,851,655 B2 | * | 2/2005 | Kume et al. | .................. 248/429 |
| 6,854,782 B2 | * | 2/2005 | Reichert et al. | .......... 296/65.13 |
| 6,870,366 B1 | * | 3/2005 | Becker et al. | .......... 324/207.26 |
| 6,907,795 B2 | * | 6/2005 | Barnabo et al. | .......... 73/862.69 |
| 6,921,107 B2 | * | 7/2005 | Mills et al. | ................... 280/735 |

* cited by examiner

*Primary Examiner*—Reena Aurora
(74) *Attorney, Agent, or Firm*—Beyer Law Group LLP

(57) ABSTRACT

An object of the present invention is to provide a member position detecting apparatus having a high degree of freedom for design and layout of a seat rail, capable of suppressing accumulation of dust and eliminating influence of an external magnetic field. A member position detecting apparatus 1 has a function of detecting whether a metallic seat rail (a moving member) 3 guided by a metallic stationary rail 2 has reached a front end position (a predetermined position) P on the stationary rail 2. The openings of the stationary rail 2 and the seat rail 3 face each other and the end portions thereof are folded and engaged with each other. The stationary rail 2 is disposed on the floor of a vehicle, and a planar magnet 5 is provided at a front end portion thereof. The seat rail 3 is fixed on a lower portion of the vehicle seat, and a magnetic sensor 7 is provided to face the magnet 5 at the front end portion of the seat rail.

7 Claims, 5 Drawing Sheets

MEMBER POSITION DETECTION APPARATUS NOT AFFECTED BY EXTERNAL MAGNETIC FIELD

BACKGROUND OF THE INVENTION

1. Field of the Invention

The present invention relates to a member position detecting apparatus used for detecting a position of a driver' seat for a vehicle, etc.

2. Description of the Related Art

An air bag apparatus provided in a vehicle enhances the safety of a driver or a passenger by inflating an air bag in response to the detection of impact in a vehicle collision. Since the air bag is inflated instantly in response to the detection of the vehicle collision, when the driver or passenger seat is adjust to the most forward position of the vehicle seat, the air bag inflating at the time of detecting the collision may severely impact the driver or the passenger.

Therefore, in order to control the operation of the air bag, there is a need for a detecting apparatus for detecting whether or not the vehicle seat of the driver or the passenger is at the most forward position at the time of the vehicle collision.

In the United States, a law requiring installation of the detecting apparatus in every newly manufactured vehicle will be in force in 2007 (US Regulation FMVSS208)

Therefore, a detecting system using a seat position sensor, for example, a magnetic sensor, was proposed (for example, see Patent Document 1).

In the system, a soft magnetic shielding plate is disposed at an outer side of a seat rail, and a magnetic sensor is disposed to extend over the soft magnetic shielding plate in order to detect the seat position according to the presence or absence of the shielding plate.

[Patent Document 1]

U.S. Pat. No. 6,053,529 (FIG. 2)

However, in the conventional art, since a shielding plate needs to be disposed outside of the seat rail and a magnetic sensor needs to be disposed to extend over the shielding plate, there are problems in that the structure is complicated and the design of layout of the seat rail is limited. Since magnetized parts are disposed outside of the seat rail, there is a problem in that dust can be easily accumulated. In addition, in a case where an external magnet of a speaker is located near the sensor, the sensor may function improperly due to the influence of the magnetic field from the external magnet.

SUMMARY OF THE INVENTION

Accordingly, the present invention is contrived in consideration of the foregoing circumstances. It is object of the present invention to provide a member position detecting apparatus having a high degree of freedom for the design of layout of a seat rail, capable of suppressing accumulation of dust and eliminating influence of an external magnetic field.

To achieve the above object, the present invention provides a member position detecting apparatus for detecting that a metallic moving member guided by a metallic stationary rail has reached a predetermined position on the stationary rail, wherein one of a magnet and a magnetic sensor is disposed at a position corresponding to the predetermined position of the stationary rail, wherein the other of the magnet and the magnetic sensor is disposed at a position of the moving member facing the stationary rail, and wherein the magnet and the magnetic sensor are disposed on inner sides of the stationary rail and the moving member.

In the member position detecting apparatus, since the magnet and the magnetic sensor are disposed inside the stationary rail and the moving member, the magnet and the magnetic sensor can be disposed without a shielding plate. Therefore, it is possible to compactly design the seat rail and to increase a degree of freedom for design of the seat rail.

In addition, since external magnetic fields from sources other than the magnet can be shielded, it is possible to suppress malfunction of the magnetic sensor due to the magnetic fields from sources other than the magnet. In addition, it is possible to prevent magnetic dust from infiltrating between the rails and accumulating on the magnet.

In addition, since external protruding parts of the rails are only the connecter portions of the magnetic sensor, it is possible to compactly integrate the rails.

In the member position detecting apparatus of the present invention, it is preferable that a central region and two side regions of a facing plane of the magnet facing the magnetic sensor be magnetized with opposite magnetic polarity, and the central region be disposed to directly face the magnetic sensor and the two side regions be disposed at both sides of the central region in the widthwise direction of the rail.

According to the member position detecting apparatus, since, in the central region of the magnet, the magnetic force line from the central region can be easily aligned with the vertical direction of the facing plane of the magnetic sensor, when the magnetic sensor reaches the opposite position of the magnet, a magnetic field having high magnetic flux density can be applied to the magnetic sensor. Therefore, it is possible to increase detection accuracy of the magnetic sensor.

In the member position detecting apparatus of the present invention, it is preferable that the openings of the stationary rail and the moving member face each other and the end portions thereof are folded and engaged with each other.

According to the member position detecting apparatus, since the stationary rail and the moving member have the aforementioned shapes, the magnet and the magnetic sensor can be shielded by both the stationary rail and the moving member. Therefore, since external magnetic dust can be further prevented from entering and the influence due to external magnetic field can be suppressed, it is possible to detect the position with a high accuracy.

In the member position detecting apparatus of the present invention, a vehicle seat may be mounted on the moving member.

According to the member position detecting apparatus, it is possible to detect a position of the vehicle seat with a high accuracy and to obtain a high degree of freedom for design of a seat rail layout. In addition, it is possible to compactly design the member position detecting apparatus and other components near the vehicle seat.

DESCRIPTION OF THE PREFERRED EMBODIMENT

Now, embodiments of the present invention will be described with reference to FIGS. 1 to 8.

Figure 1:
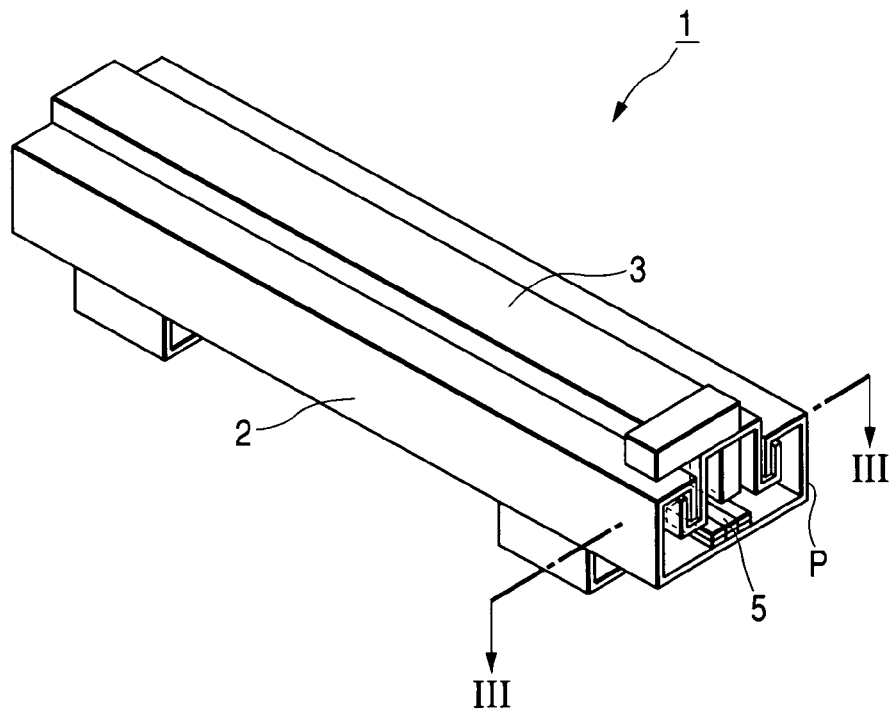
FIG. 1 is a perspective view illustrating a state where a member position detecting apparatus according to an embodiment of the present invention is located at a predetermined position.

A member position detecting apparatus 1 according to an embodiment has a function of detecting whether a metallic seat rail (a moving member) 3 guided by a metallic stationary rail 2 has reached a front end position (a predetermined position) P of the stationary rail 2, as shown in FIG. 1.

Figure 2:
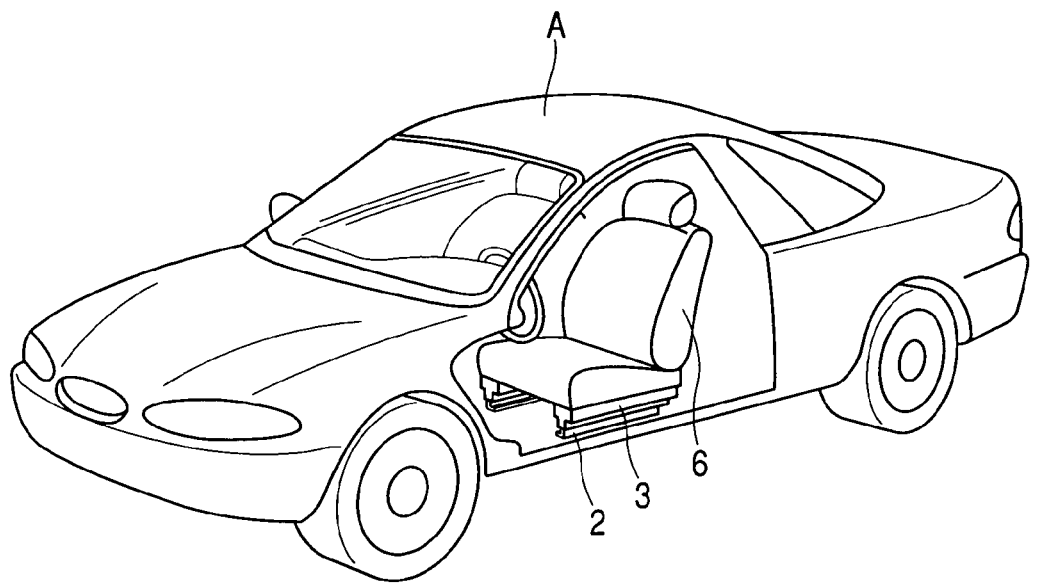
FIG. 2 is a perspective view illustrating a mounting position in a vehicle at which a member position detecting apparatus according to an embodiment of the present invention is mounted.
Figure 3:
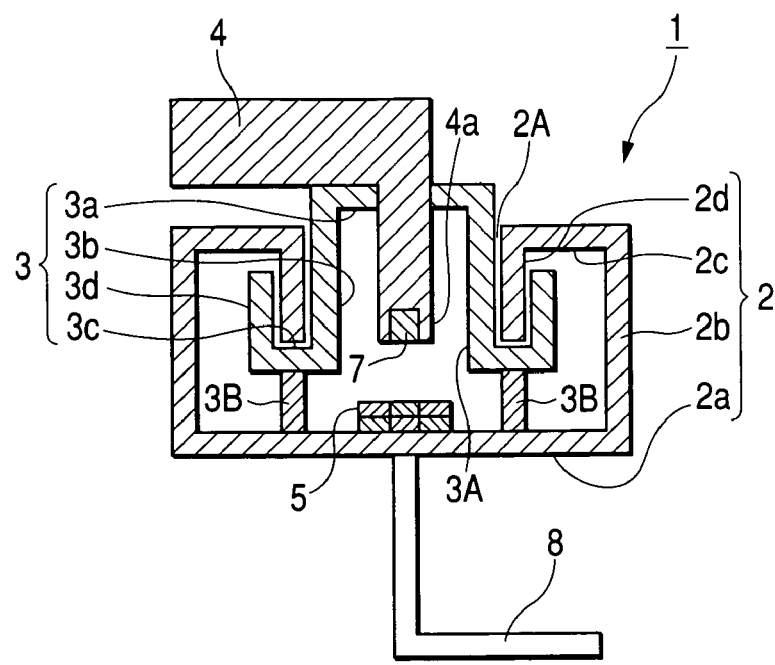
FIG. 3 is a sectional view taken along line III-III of FIG. 1.

As shown in FIGS. 2 and 3, the stationary rail 2 having an upwardly oriented opening 2A extends along a floor of a vehicle A in a lengthwise direction. The stationary rail 2 comprises a stationary-side base 2a at the center of the stationary rail and two stationary-side elbowed portions 2b and 2b, which is upwardly elbowed, constituting sidewalls of the stationary rail 2. In addition, front ends 2d of the stationary-side elbowed portions 2b are folded downwardly in an L-shape, and stationary-side trench portions 2c are provided along the inner sides of the stationary-side elbowed portions.

A planar magnet 5 is provided on the stationary-side base 2a from the front end position P to a position separated by several tens of millimeters, for example, 30 mm.

As shown in FIGS. 2 and 3, a seat rail 3 having a downwardly oriented opening 3A is fixed on a lower portion of a vehicle seat 6. The seat rail 3 comprises a moving-side base 3a at the center of the width of the seat rail and two moving-side elbowed portions 3b, which is downwardly elbowed. In addition, the front ends 3d of the moving-side elbowed portions 3b are upwardly folded, and moving-side trench portions 3c are provided along the inner side of the moving-side elbowed portions 3b.

At a longitudinal front end of the moving-side base 3a is disposed an L-shaped attachment member 4 passing through the moving-side base 3a, so that the frond end 4a of the attachment member 4 is located at the center of the opening 3A of the seat rail 3. A magnetic sensor 7 capable of facing the magnet 5 is provided on the front end 4a of the attachment member 4.

The stationary-side base 2a of the stationary rail 2 faces the moving-side base 3a of the seat rail 3. The stationary-side trench portions 2c of the stationary rail are engaged with the moving-side trench portions 3c of the seat rail. As a result, the magnet 5 and the magnetic sensor 7 are enclosed by the stationary-side elbowed portions 2b and the moving-side elbowed portions 3b.

The seat rail 3 are movably supported by support members 3B, for example, bearings, which are disposed between the stationary-side base 2a and the outer sides of the moving-side trench portions 3c.

In addition, the stationary rail 2 is affixed to the floor of the vehicle A with fixtures.

Figure 4:
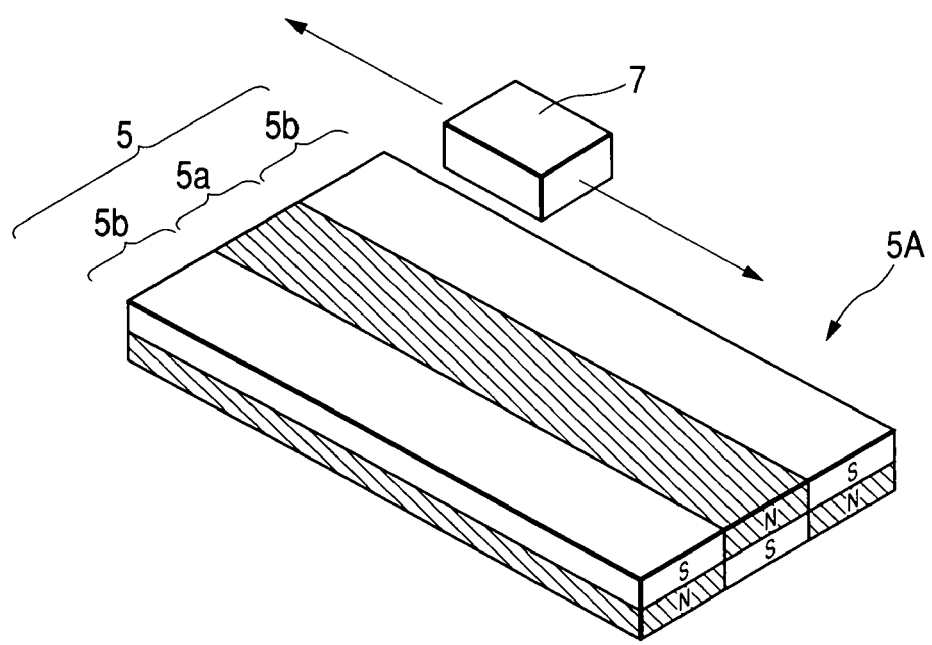
FIG. 4 is a perspective view illustrating a magnet of a member position detecting apparatus according to an embodiment of the present invention.

As shown in FIG. 4, a facing plane 5A of the magnet 5 facing the magnetic sensor 7 is divided into a central region 5a, which becomes an opposite position (a front side) of the magnetic sensor 7, and two side regions 5b in the width direction of the stationary rail 2. The central region 5a are magnetized with the opposite magnetic polarity from the side regions 5b. In the embodiment, the central region 5a and the side regions 5b are magnetized with magnetic poles N and S, respectively.

For this reason, compared with a case where the facing plane is magnetized with only one magnetic pole, N or S, the magnetic force line J of the magnetic pole N of the central region 5a is more vertically oriented due to the influence of both magnetic poles S of the side regions 5b.

Accordingly, the magnetic sensor 7 of the attachment member 4 can be located in the vertical direction of the central region 5a.

In addition, the planes of the central region 5a and the side regions 5b of the magnet 5 attached to the stationary rail 2 are magnetized with magnetic poles S and N, respectively.

For example, the magnetic sensor 7 is a magneto-electrical conversion sensor utilizing the Hall effect of a Hall element for converting the magnetic change into electrical change, which outputs OFF and ON signals to the magnet and the other regions, respectively.

Now, the operational method of the member position detecting apparatus 1 having the aforementioned construction will be described.

Figure 5:
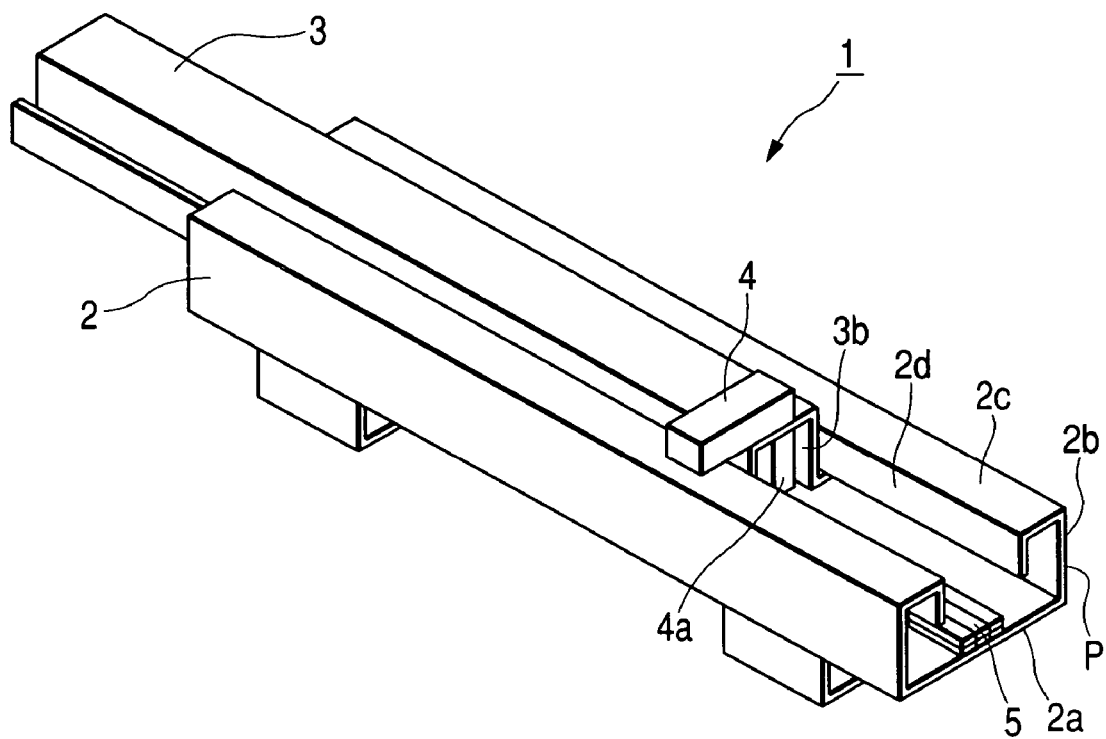
FIG. 5 is a perspective view illustrating a state where a member position detecting apparatus according to an embodiment of the present invention is not located at the predetermined position.
Figure 6A:
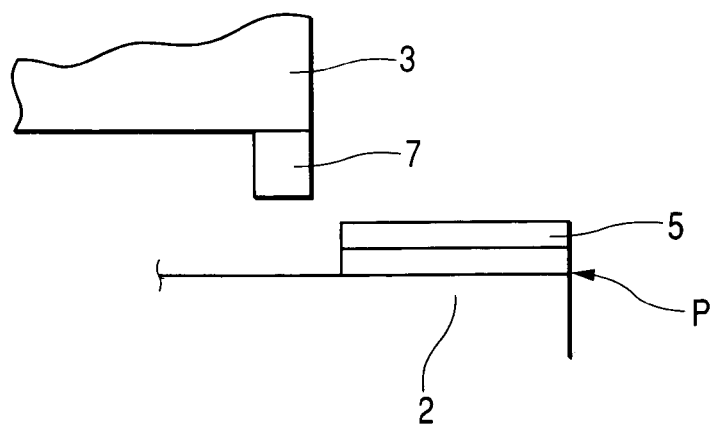
FIG. 6 is a view for explaining positional relationships between the stationary rail and the seat rail during the movement of the member position detecting apparatus according to an embodiment of the present invention.

When a driver occupies the vehicle seat 6, the positional relationships between the seat rail 3 and the stationary rail 2 is in a state shown in FIGS. 5 and 6A. In this state, the seat rail 3 does not reach the front end position P of the stationary rail 2, and the magnetic sensor 7 of the seat rail 3 does not face the magnet 5 of the stationary rail 2.

Figure 6B:
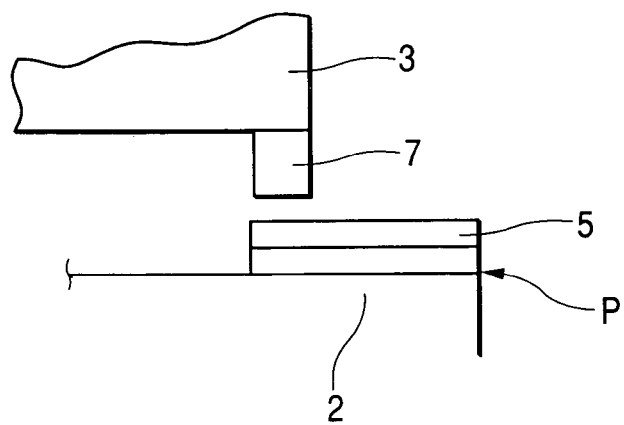
Figure 7:
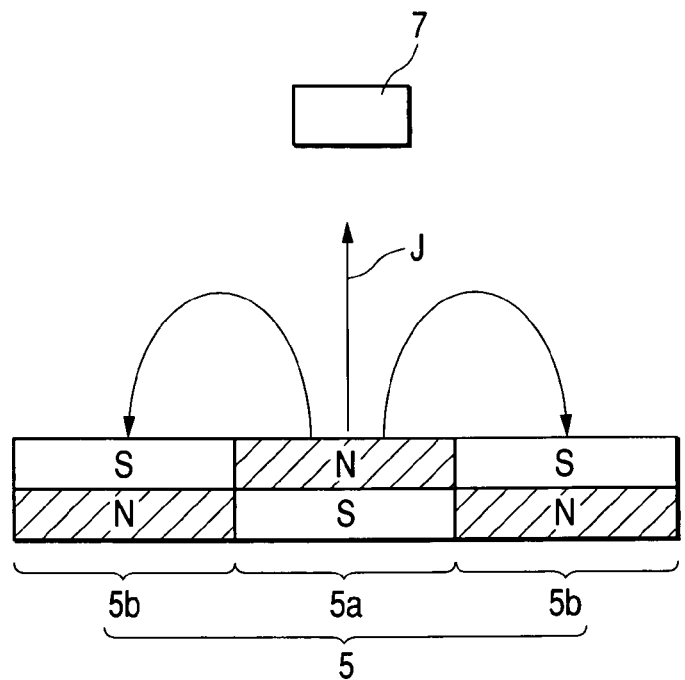
FIG. 7 is an image view illustrating a distribution of magnetic force lines from a magnet of a member position detecting apparatus according to an embodiment of the present invention.
Figure 8:
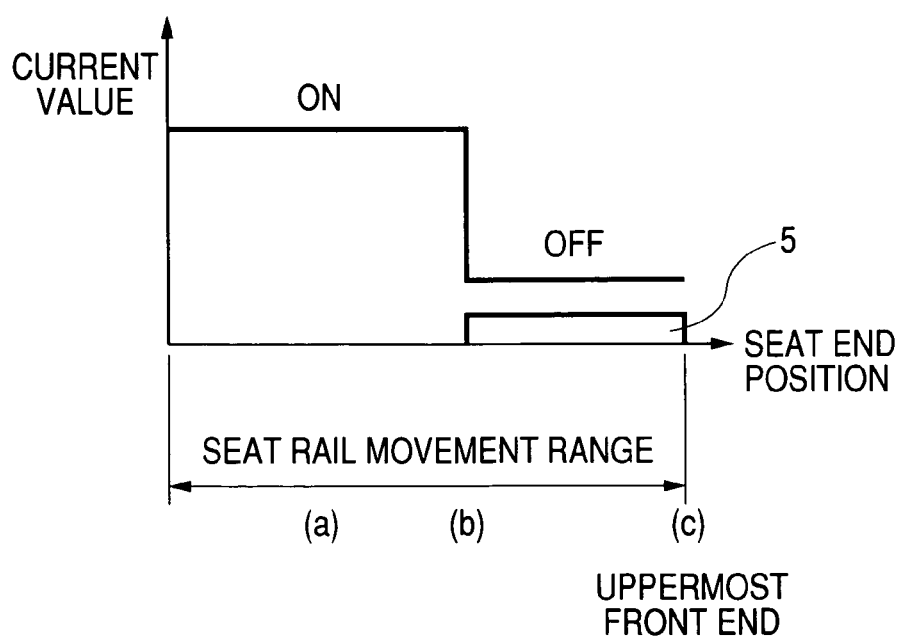
FIG. 8 is a graph illustrating relationships between positions of a vehicle seat and outputs of a magnetic sensor of a member position detecting apparatus according to an embodiment of the present invention.

After that, the driver move the vehicle seat 6 in forward direction of the body, so that the magnetic sensor 7 is located opposite the magnet 5 as shown in FIG. 6B. At this time, since the magnet force line J vertically extends from the central region 5a of the magnet 5 as shown in FIG. 7, the magnetic sensor 7 senses the magnetic force line J and converts the magnetic change into electrical current change, so that the output signal changes from ON signal to OFF signal, as shown in FIG. 8.

Figure 6C:
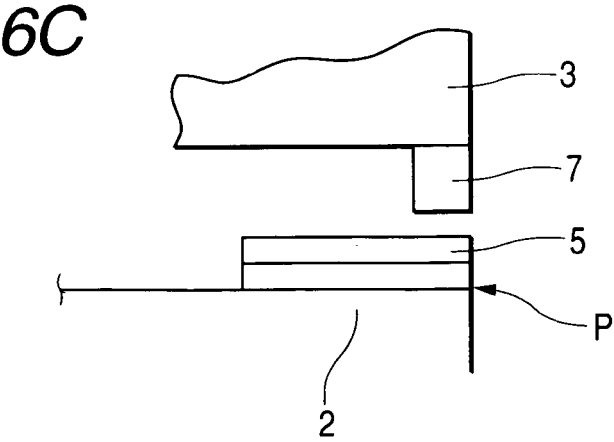

This state is maintained until the front end of the seat rail 3 reaches the front end position P, as shown in FIG. 6C.

Accordingly, it is detected from the output value of the magnetic sensor 7 that the vehicle seat 6 is located in a range between the position shown in FIG. 6B and the front end position P of the stationary rail 2 shown in FIG. 6C.

According to the member position detecting apparatus 1, it is determined by detecting the presence or absence of the magnetic field from the magnet 5 with the magnetic sensor 7 whether or not the vehicle seat 6 is located in proximity to the front end position P. Therefore, the deterioration of the magnetic sensor is less than that of a contact type sensor. In addition, when contaminants accumulates on the magnetic sensor 7, the magnetic sensor does not function improperly and is immune to the contaminants, as compared with an optical sensor, so that the magnetic sensor can be used for a long time.

In addition, since the magnet 5 and the magnetic sensor 7 are disposed within the space defined by the stationary rail 2 and the seat rail 3 which have substantially U-shaped cross section, the magnet and the magnetic sensor can be disposed without a shielding plate typically required by conventional magnetic sensors. Therefore, it is possible to compactly design the stationary rail 2 and the seat rail 3, and to increase a degree of freedom for design of the rails.

In addition, in a case where a magnetic material such as a speaker of an audio apparatus (not shown) is installed below the vehicle seat 6, the magnetic field from the magnetic material can be shielded by the metallic stationary-side elbowed portions 2b and the metallic moving-side elbowed portions 3b. Therefore, since the magnetic field has no influence on the magnet 5 and the magnetic sensor 7, their malfunction can be suppressed, so that it is possible to stably detect the position.

In addition, even in a case where there is magnetic dust outside the rails within the vehicle, since the stationary-side elbowed portions 2b and the moving-side elbowed portions 3b form walls, the dust cannot enter inner spaces of the stationary rail 2 and the seat rail 3, so that the magnetic performance of the magnet can be stably maintained.

In addition, as shown in FIG. 7, since the central region 5a and the side regions 5b of the facing plane of the magnet 5 facing the magnetic sensor 7 are magnetized with opposite magnetic polarity, the magnetic force line J from the central region 5a can be easily aligned with the vertical direction of the facing plane of the magnetic sensor 7, and, when the magnetic sensor 7 reaches the position opposite the magnet 5, a magnetic field having high magnetic flux density can be applied to the magnetic sensor 7. Therefore, it is possible to increase detection accuracy of the magnetic sensor 7.

The present invention is not limited to the aforementioned embodiments, and various modifications can be made without departing from the principle and scope of the present invention.

For example, in the aforementioned embodiment, the magnet 5 and the magnetic sensor 7 are disposed at the front end position P of the stationary rail 2. However, locations of the magnet 5 and the magnetic sensor 7 are not limited to the front end position P if it can be determined whether or not the seat rail 3 has reached the front end position P.

In addition, in the aforementioned embodiment, the central region 5a and the side regions 5b of the facing plane of the magnet 5 facing the magnetic sensor 7 are magnetized with the magnetic poles N and S, respectively. However, the central region 5a and the side regions 5b may be magnetized with the magnetic poles S and N, respectively.

In addition, the output signal of the magnetic sensor 7 may be a current signal or a voltage signal. In addition, the ON signal may be output as an output signal when the magnetic sensor faces the magnet 5.

In addition, the vehicle seat is not limited to the driver's seat, and the vehicle seat may be the passenger's seat.

In addition, the magnet may be a permanent magnet or an electromagnet. Any sensor capable of detecting magnetic field can be employed as the magnetic sensor.

The following effects are obtained by the aforementioned present invention.

According to a member position detecting apparatus of the present invention, since externally protruding parts of a stationary rail and moving member can be reduced, it is possible to increase a degree of freedom for design of the seat rail layout, and thus, to compactly design components near the vehicle seat.

In addition, since dust, etc., cannot accumulate and external magnetic field cannot have an influence, it is possible to obtain stable detection performance and to accurately detect that the vehicle seat reaches a predetermined position. In addition, the present invention can sufficiently cope with, for example, the regulation US FMVSS208.

What is claimed is:

1. A member position detecting apparatus for detecting that a metallic moving member guided by a metallic stationary rail has reached a predetermined position of the stationary rail,
   wherein one of a magnet and a magnetic sensor is disposed at a position corresponding to the predetermined position of the stationary rail,
   wherein the other of the magnet and the magnetic sensor is disposed at a position of the moving member facing the stationary rail,
   wherein the magnet is disposed on an inner side of the stationary rail, and the magnetic sensor is disposed on an inner side of the moving member,
   wherein a central region of a facing plane of the magnet faces the magnetic sensor, and a magnetic polarity is different at both sides of the central region, and the magnetic polarity of a rear surface of the magnet is different from the magnetic polarity of the facing plane facing the magnetic sensor,
   wherein the magnet and the magnetic sensor are surrounded by the metallic stationary rail and the metallic moving member,
   wherein the magnet is provided on one end portion of the stationary rail, and another end portion of the stationary rail does not have the magnet, and
   wherein a border of the different magnetic polarities of the facing plane of the magnet is parallel to the movement of the magnetic sensor disposed on the metallic moving member.

2. The member position detecting apparatus according to claim 1,
   wherein openings of the stationary rail and the moving member face each other and end portions thereof are folded and engaged with each other, and
   wherein the magnet and the magnetic sensor are disposed inside the openings.

3. The member position detecting apparatus according to claim 1, wherein a vehicle seat is fixed on the moving member.

4. A member position detecting apparatus for detecting that a metallic moving member guided by a metallic stationary rail has reached a predetermined position of the stationary rail, the apparatus comprising:
   a magnet disposed on an inner side of the stationary rail at a position corresponding to the predetermined position of the stationary rail; and
   a magnetic sensor disposed on an inner side of the moving member so as to face the inner side of the stationary rail,
   wherein the magnet includes a facing plane facing the inner side of the moving member, the facing plane includes:
   a central region having a first magnetic polarity; and
   side regions provided on both sides of the central region, the side regions having a second magnetic polarity opposite to the first magnetic polarity,
   and wherein the central region of the magnet faces the magnetic sensor when the metallic moving member reaches the predetermined position, and a border between the central region and each side region is parallel to a direction of the movement of the magnetic sensor.

5. The member position detecting apparatus according to claim 4,
   wherein the magnet and the magnetic sensor are enclosed by the metallic stationary rail and the metallic moving member such that the magnet and the magnetic sensor are shielded from external magnetic fields.

6. The member position detecting apparatus according to claim 4,
wherein the magnetic sensor outputs a control signal when the metallic moving member reaches the predetermined position, the control signal controlling inflation of an air bag of a vehicle.

7. The member position detecting apparatus according to claim 4, wherein the magnet further includes a rear surface provided on an opposite side of the facing plane, the rear surface including:
a rear central region having the second magnetic polarity; and rear side regions provided on both sides of the rear central region, the rear side regions having the first magnetic polarity.

* * * * *